United States Patent
Kobayashi et al.

(10) Patent No.: US 12,118,313 B2
(45) Date of Patent: Oct. 15, 2024

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Tokyo (JP)

(72) Inventors: Yuka Kobayashi, Seto Aichi (JP); Takami Yoshida, Kamakura Kanagawa (JP); Kenji Iwata, Machida Tokyo (JP); Tsuyoshi Kushima, Kawasaki Kanagawa (JP); Hisayoshi Nagae, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 18/166,303

(22) Filed: Feb. 8, 2023

(65) Prior Publication Data

US 2024/0012998 A1 Jan. 11, 2024

(30) Foreign Application Priority Data

Jul. 8, 2022 (JP) .................... 2022-110120

(51) Int. Cl.
*G06F 17/00* (2019.01)
*G06F 40/166* (2020.01)
(Continued)

(52) U.S. Cl.
CPC .......... *G06F 40/289* (2020.01); *G06F 40/166* (2020.01); *G06F 40/242* (2020.01)

(58) Field of Classification Search
CPC .... G06F 40/289; G06F 40/166; G06F 40/242; G06F 40/279; G06F 40/205; G06F 40/284
See application file for complete search history.

(56) References Cited

U.S. PATENT DOCUMENTS 9,189,514 B1 * 11/2015 Myslinski ............. G06F 16/345
11,809,480 B1 * 11/2023 Cheng .................. G06F 16/438
(Continued)

FOREIGN PATENT DOCUMENTS

JP 5884740 B2 2/2016
JP 7055764 B2 4/2022

OTHER PUBLICATIONS

Fabbri, Alexander R., et al. "Summeval: Re-evaluating summarization evaluation." Transactions of the Association for Computational Linguistics 9 (2021): 391-409 (Year: 2021).*

(Continued)

*Primary Examiner* — Andrew T McIntosh
(74) *Attorney, Agent, or Firm* — Holtz, Holtz & Volek PC (57) ABSTRACT

An information processing device includes at least one hardware processor. The hardware processor selects one or more pieces of partial document data from document data. The hardware processor extracts, from the partial document data, first information being a word or a phrase for specifying a first attribute of the partial document data. The hardware processor extracts, from the partial document data, second information being a word or a phrase for specifying a second attribute of the partial document data. The hardware processor calculates a first feature value representing a feature of the first information. The hardware processor calculates a second feature value representing a feature of the second information. The hardware processor analyzes the document data on the basis of the first feature value and the second feature value.

16 Claims, 8 Drawing Sheets

(51) Int. Cl.
   *G06F 40/242*   (2020.01)
   *G06F 40/289*   (2020.01)

(56) References Cited

U.S. PATENT DOCUMENTS

| | | | |
|---|---|---|---|
| 2013/0311471 | A1 | 11/2013 | Okajima et al. |
| 2017/0256284 | A1* | 9/2017 | Uchihashi .............. G11B 27/28 |
| 2017/0262455 | A1* | 9/2017 | Gallivan ................ G06F 16/285 |
| 2019/0129942 | A1* | 5/2019 | Seuss ...................... G06F 40/56 |
| 2019/0362019 | A1* | 11/2019 | Oya ....................... G06F 16/951 |
| 2020/0293717 | A1 | 9/2020 | Kobayashi et al. |
| 2022/0222461 | A1* | 7/2022 | Mann .................. G06F 21/6209 |

OTHER PUBLICATIONS

Deveaud, Romain, and Florian Boudin. "Effective tweet contextualization with hashtags performance prediction and multi-document summarization." Initiative for the Evaluation of XML Retrieval (INEX). 2013 (Year: 2013).*

Wang, Xiaolong, et al. "Topic sentiment analysis in twitter: a graph-based hashtag sentiment classification approach." Proceedings of the 20th ACM international conference on Information and knowledge management. 2011 (Year: 2011).*

Delvin, et al., "BERT: Pre-training of Deep Bidirectional Transformers for Language Understanding", Oct. 11, 2018.

Mikolov, et al., "Distributed Representations of Words and Phrases and their Compositionality", Advances in Neural Information Processing Systems.

* cited by examiner

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2022-110120, filed on Jul. 8, 2022; the entire contents of which are incorporated herein by reference.

FIELD

Embodiments described herein relate generally to an information processing device, an information processing method, and a computer program product.

BACKGROUND

There is a technology that extraction of important phrases or extraction of information about the topic of a document is performed when generating a summary sentence. In such a technology, the document is analyzed on the basis of the extraction result.

Specifically, for example, focused document topic words are extracted from a focused document, and background topic words are extracted from a reference document. Then, phrases, which contain both focused document topic words and background topic words, are extracted from the focused document. The extracted phrases are used in a summary sentence.

In the conventional technology, however, it is difficult to analyze documents with high accuracy in some cases.

DETAILED DESCRIPTION

An information processing device according to an embodiment includes one or more hardware processors. The one or more hardware processors are configured to select one or more pieces of partial document data from document data. The one or more hardware processors are configured to extract, from the partial document data, first information being a word or a phrase for specifying a first attribute of the partial document data. The one or more hardware processors are configured to extract, from the partial document data, second information being a word or a phrase for specifying a second attribute of the partial document data. The one or more hardware processors are configured to calculate a first feature value representing a feature of the first information. The one or more hardware processors are configured to calculate a second feature value representing a feature of the second information. The one or more hardware processors are configured to analyze the document data on the basis of the first feature value and the second feature value.

With reference to the accompanying drawings, preferable embodiments of an information processing device will be described in detail hereinafter.

As described above, the conventional technology is difficult to analyze documents with high accuracy in some cases. For example, with an analysis based on topics (issues), it is not possible to deal with documents with new topics.

On the other hand, there are unique phrases (formulas) used in documents to present important information. By performing analysis on the basis of information that represents such phrases (format information), it is expected to improve accuracy compared to analysis based on topics alone.

The above technology for generating a summary sentence uses not only focused document topic words but also background topic words, whereas input of another document (reference document) is needed for extracting the background topic words. In a case where information indicating topics (topic information) is used in conjunction with format information, it is desirable to eliminate the necessity of inputting such another document.

First Embodiment

An information processing device according to a first embodiment extracts a plurality of pieces of information being words or phrases for specifying attributes from the same document data, and calculates feature values representing features of the pieces of information. Then, the information processing device of the present embodiment analyzes the document data by using the feature values. This makes it possible to analyze documents with higher accuracy.

In the present embodiment, the attributes includes, as examples, an attribute (a first attribute) that describes a topic of partial document data and an attribute (a second attribute) that describes an expression used in common with other partial document data. Note that the attributes are not limited to those.

Also, partial document data is data contained in the document data to be a target of analysis, such as, but not limited to, a single sentence, a plurality of sentences (for example, a paragraph), and words or phrases in units smaller than a sentence (for example, words or phrases punctuated with commas), for example. In the following, a case where a sentence is taken as partial document data will mainly be described as an example.

Figure 1:
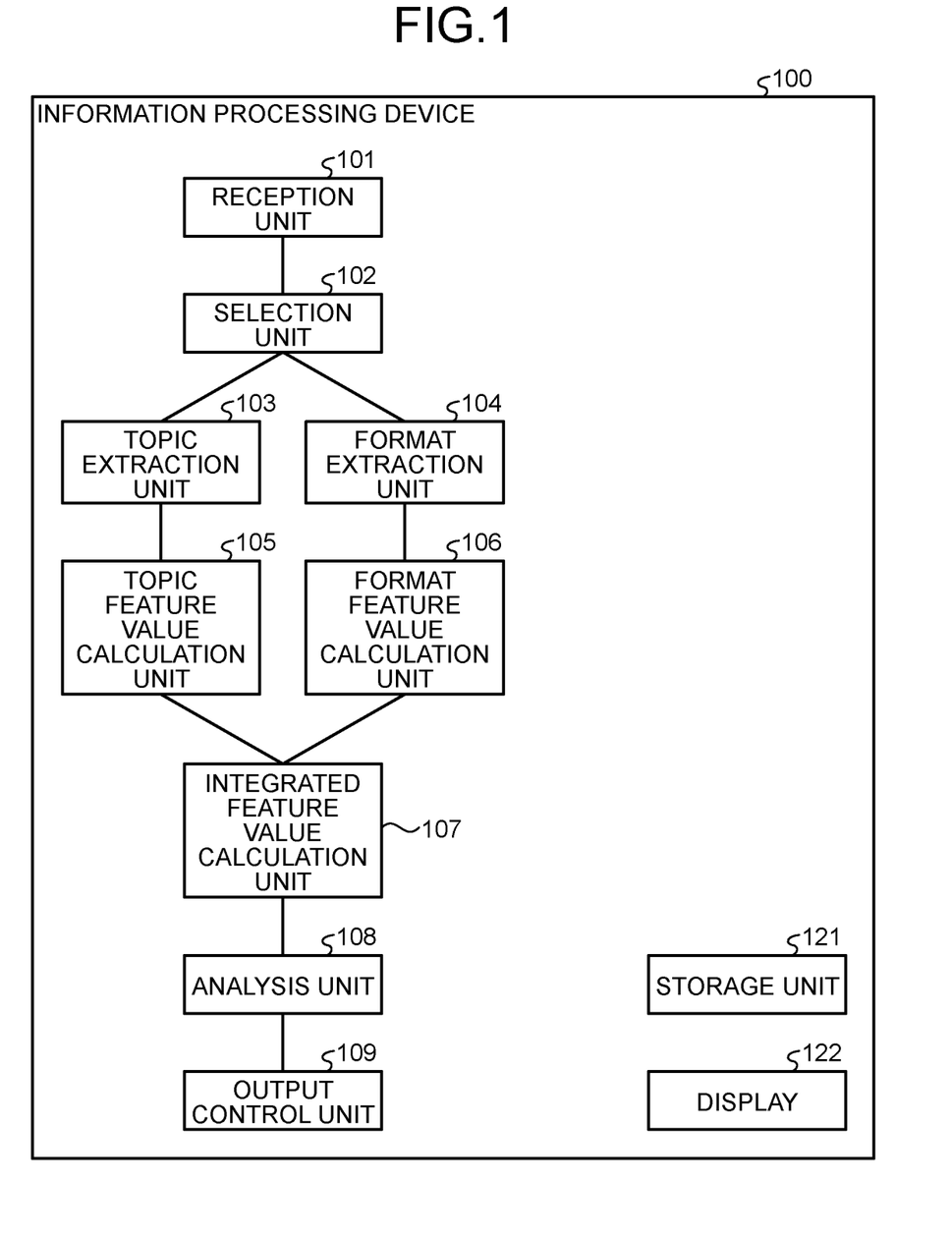
FIG. 1 is a block diagram of an information processing device according to a first embodiment.

FIG. 1 is a block diagram illustrating an example of a configuration of an information processing device 100 according to the first embodiment. As illustrated in FIG. 1, the information processing device 100 includes a reception unit 101, a selection unit 102, a topic extraction unit 103 (an example of a first extraction unit), a format extraction unit 104 (an example of a second extraction unit), a topic feature value calculation unit 105 (an example of a first feature value calculation unit), a format feature value calculation unit 106 (an example of a second feature value calculation unit), an integrated feature value calculation unit 107, an analysis unit 108, an output control unit 109, a storage unit 121, and a display 122.

The reception unit 101 receives input of various kinds of information used in the information processing device 100. For example, the reception unit 101 receives input of document data to be an analysis target. Document data may be created by any method. For example, document data may be data of documents written by people, such as newspaper articles, academic articles, documents on websites, and documents on social media (social networking services: SNS), or data documented by speech recognition or transcription of audio from meetings, lectures, and the like. Document data includes one or more sentences (an example of partial document data).

The selection unit 102 selects one or more sentences (partial document data) from the document data. While any method may be applied for the selection method, it is possible to apply a method of selecting all sentences contained in the document data and a method of selecting sentences except for unnecessary sentences, for example.

The topic extraction unit 103 extracts, from each of the selected sentences, information (first information) that is a word or a phrase for specifying a topic (an example of the first attribute) of the sentence. Hereafter, the information extracted by the topic extraction unit 103 is referred to as topic information.

The format extraction unit 104 extracts, from each of the selected sentences, information (second information) that is a word or a phrase used for specifying an expression (an example of the second attribute) used in common with other sentences. The information corresponds to information (format information) that represents the format of the document, such as phrasing, for example. Hereafter, the information extracted by the format extraction unit 104 is referred to as format information.

As an extraction method of topic information and format information, it is possible to employ any one of the following examples.

Extraction Method E1: Information contained in a format information dictionary (an example of dictionary information) created in advance is extracted as format information, and information not contained in the format information dictionary is extracted as topic information.

The format information dictionary is created as follows, for example. First, for each word contained in a large number of documents prepared in advance, the number of documents containing the word is counted, and an inverse document frequency (IDF) is calculated by the following formula.

$$IDF = (\text{number of all documents})/(\text{number of documents containing the word})$$

The smaller the IDF, the more common the word is considered to be contained in various documents. For this reason, a format information dictionary is created by collecting words whose IDF is smaller than a threshold as format information.

The format extraction unit 104 makes reference to the format information dictionary created in this manner, and extracts the words contained in the format information dictionary as format information from among the words contained in a selected sentence. The topic extraction unit 103 extracts the words not contained in the format information dictionary as topic information from among the words contained in the selected sentence.

Hereinafter, extraction examples of the format information and the topic information are presented.

Example 1
  Selected sentence: "So let's learn about communication under a remote work condition today."
  Format information: "So let's learn about ______ under ______ today."
  Topic information: "remote work, communication"

Example 2
  Selected sentence: "Nonverbal channels such as facial expressions and hand gestures cannot be used in a conference call."
  Format information: "______ such as ______ and ______ cannot be used in ______."
  Topic information: "conference call, facial expression, hand gesture, nonverbal, channel"

Note that the format information dictionary is a dictionary of words not related to the topic of the document data. Therefore, it can also be applied to document data that is different from the document data used for creating the format information dictionary.

The creation method of a format information dictionary is not limited to the example described above. A format information dictionary may be created by collecting common words by using information different from the IDF. In one example, such information may be word2vec. In this case, for example, a word2vec model is trained in advance for each word. The smaller the magnitude of a vector of word2vec, the more common the word can be interpreted as. In other words, a format information dictionary can be created by collecting words whose vector magnitude is smaller than a threshold.

An extraction method E1 can be interpreted as a method for extracting topic information and format information in accordance with a comparison result between a score representing frequency in the document data and a threshold. In other words, the topic extraction unit 103 extracts, as topic information, the words or phrases whose scores representing the frequency in the document data are smaller than the threshold. The format extraction unit 104 extracts, as format information, the words or phrases whose scores representing the frequency in the document data are equal to or larger than the threshold. The score representing the frequency is, for example, the magnitude of the vector of the IDF or the vector of word2vec (the magnitude of an element corresponding to each word in the vector).

Extraction Method E2: Information contained in a topic information dictionary (an example of dictionary information) created in advance is extracted as topic information, and information not contained in the topic information dictionary is extracted as format information.

The topic information dictionary is created as follows, for example. First, highly common words are collected by an IDF or word2vec from documents related to an analysis target prepared in advance. Words other than the collected highly common words are collected as topic information to create a topic information dictionary.

The format extraction unit 104 makes reference to the topic information dictionary created in this manner, and extracts the words not contained in the topic information dictionary as format information from among the words contained in a selected sentences. The topic extraction unit 103 extracts the words contained in the topic information dictionary as topic information from among the words contained in the selected sentence.

Extraction Method E3: Topic information with which a confidence level (a first confidence level) indicating the certainty of representing a topic is associated, and format information with which a confidence level (a second confidence level) indicating the certainty of expressing an expression used in common with other sentences is associated are extracted.

The topic extraction unit 103 determines, for example, the magnitude of an IDF or word2vec as the confidence level of the topic information (the first confidence level), and extracts each word contained in a selected sentence as the topic information along with the confidence level.

The format extraction unit 104 determines, for example, a reciprocal of the magnitude of the IDF or word2vec, or a value acquired by multiplying the magnitude of the IDF or word2vec by −1 as the confidence level of the format information (the second confidence level), and extracts each word contained in the selected sentence as the format information along with the confidence level.

In the extraction method E3, all words contained in the selected sentence are contained in both topic information and format information. When the extraction method E3 is employed, the topic feature value calculation unit 105 and the format feature value calculation unit 106 are configured to calculate feature values corresponding to the confidence levels.

The topic feature value calculation unit 105 calculates a feature value (a first feature value) that represents the feature of the topic information. Hereinafter, the feature value calculated by the topic feature value calculation unit 105 is referred to as a topic feature value.

For example, the topic feature value calculation unit 105 counts the frequency of each word contained in the topic information, and calculates a vector enumerating the frequency of each word contained in the sentence as the topic feature value. As indicated in Example 1 and Example 2 described above, when the topic information is a word sequence, a vector enumerating the frequency of each word contained in the word sequence is calculated as the topic feature value.

Note that the calculation method of topic feature values is not limited to that. The topic feature value calculation unit 105 may convert each word into a vector by using a model that converts words or sentences into vectors, and such a vector may be used as the topic feature value. Examples of such a model may be word2vec and bidirectional encoder representations from transformers (BERT).

In a case of the configuration that extracts the topic information with which the confidence level (the first confidence level) is associated, the topic feature value calculation unit 105 calculates the topic feature value by taking the confidence level into account. For example, the topic feature value calculation unit 105 multiplies each element of the vector representing the feature of the topic calculated with the method described above by the confidence level associated with the word corresponding to each element to acquire the topic feature value. For each sentence, the topic feature value calculation unit 105 may acquire the average value of the confidence levels associated with the words contained in the sentence, and multiply the acquired average value by the feature value.

The format feature value calculation unit 106 calculates the feature value (the second feature value) that represents the feature of the format information. Hereafter, the feature value calculated by the format feature value calculation unit 106 is referred to as a format feature value.

For example, the format feature value calculation unit 106 converts the format information into a vector by using models such as word2vec and BERT, and determines this vector as the format feature value.

In a case of the configuration that extracts the format information with which the confidence level (the second confidence level) is associated, the format feature value calculation unit 106 calculates the format feature value by taking the confidence level into account. The calculation method of the feature value with the confidence level taken into account is similar to the calculation method of the topic feature value with the confidence level taken into account, except that the topic information is replaced with the format information.

The integrated feature value calculation unit 107 calculates an integrated feature value representing the feature of a sentence on the basis of the topic feature value and the format feature value. Specifically, for example, the integrated feature value calculation unit 107 calculates the integrated feature value by performing weighted addition of the topic feature value and the format feature value, or by performing multiplication of the topic feature value and the format feature value. Predetermined fixed values or values learned by a machine learning model may be used for the weight for the topic feature value and the weight for the format feature value.

Note that the calculation method of the integrated feature value is not limited to the one described above. For example, the integrated feature value calculation unit 107 may calculate the integrated feature value by using a machine learning model such as a neural network model trained with a plurality of feature values input thereto such that an integrated feature value is output.

The analysis unit 108 analyzes the document data on the basis of the topic feature value and the format feature value. For example, the analysis unit analyzes the document data by using one or more integrated feature values calculated on the basis of the topic feature values and the format feature values for each of one or more sentences. Any method may be used for the analysis method using integrated feature values, and the following analysis methods may be applied, for example.

Analysis Method A1: Keywords are assigned to document data for making it easy to manage and retrieve the document data. Keywords are extracted as a predetermined number of words in descending order of frequency in word sequences extracted as the topic information, for example. The analysis unit 108 may find keywords or sentences containing keywords by using a model such as a neural network model that receives the integrated feature value for each word and outputs information indicating whether each word is a keyword.

Analysis Method A2: By using integrated feature values, a label is assigned to each of one or more sentences contained in document data. For example, a plurality of labels may be prepared in advance, and the analysis unit 108 may assign one of the labels to each sentence. An academic article, for example, is often divided into a plurality of sections such as introduction, previous research, proposed methodology, experimental results, and conclusion. The analysis unit 108 can assign a label to indicate which section each sentence represents. The analysis unit 108 can also assign labels indicating the kinds of sentences, such as a question, an answer, and a suggestion, depending on the content of a sentence. While any method may be used for the label assigning method, for example, the analysis unit 108 assigns a label to each sentence by using a model such as a neural network model that receives the integrated feature value of each sentence and outputs a label.

Analysis Method A3: A summary of the document data is generated by using integrated feature values. Not only a single summary sentence but also a plurality of summary sentences can be generated. While any method may be used for the summary sentence generation method, for example, the analysis unit 108 generates a summary sentence by using a model such as a neural network model that receives the integrated feature value of each sentence and outputs a summary sentence.

The analysis unit 108 may analyze the document data without using the integrated feature values. For example, the analysis unit 108 may compare an analysis result acquired by analyzing the document data by using the topic feature value (a first analysis result) with an analysis result acquired by analyzing the document data by using the format feature value (a second analysis result). Then, in a case where they do not correspond to one another, the analysis unit 108 may output either one of them in accordance with a rule defined in advance. In a case where they correspond to one another, the analysis unit 108 outputs the both analysis results. The rule may be any rule, but it is a rule indicating that the analysis result with a greater confidence level is output preferentially, for example. In a case of not using integrated feature values, the integrated feature value calculation unit 107 may not need to be provided.

The output control unit 109 controls output of various kinds of information used in the information processing device 100. For example, the output control unit 109 outputs information indicating the analysis results acquired by the analysis unit 108 to the display 122. The output method is not limited to a method of displaying the analysis results on the display 122, but may be any other method such as transmitting the analysis results to another device via a network, for example.

The storage unit 121 stores therein various kinds of information used in the information processing device 100. For example, the storage unit 121 stores therein received document data, one or more sentences selected from the document data, topic information and format information extracted from the sentences, calculated feature values (topic feature values, format feature values, integrated feature values), and the like.

The storage unit 121 may be configured with any commonly used storage medium such as a flash memory, a memory card, a random-access memory (RAM), a hard disk drive (HDD), and an optical disc.

The display 122 is a display device that displays various kinds of information in accordance with the control of the output control unit 109. The display 122 can be implemented by, for example, a touch panel, a liquid crystal display, and so forth.

Each of the above units (the reception unit 101, the selection unit 102, the topic extraction unit 103, the format extraction unit 104, the topic feature value calculation unit 105, the format feature value calculation unit 106, the integrated feature value calculation unit 107, the analysis unit 108, and the output control unit 109) is implemented by a single or a plurality of processors, for example. For example, each of the above units may be implemented by causing one or more hardware processors such as a central processing unit (CPU) to execute a computer program, namely, implemented by software. Each of the above units may be implemented by one or more hardware processors such as a dedicated integrated circuit (IC), namely, implemented by hardware. Each of the above units may be implemented by a combination of software and hardware. In a case of using a plurality of processors, each of the processors may implement one of the units or may implement two or more of the units.

Figure 2:
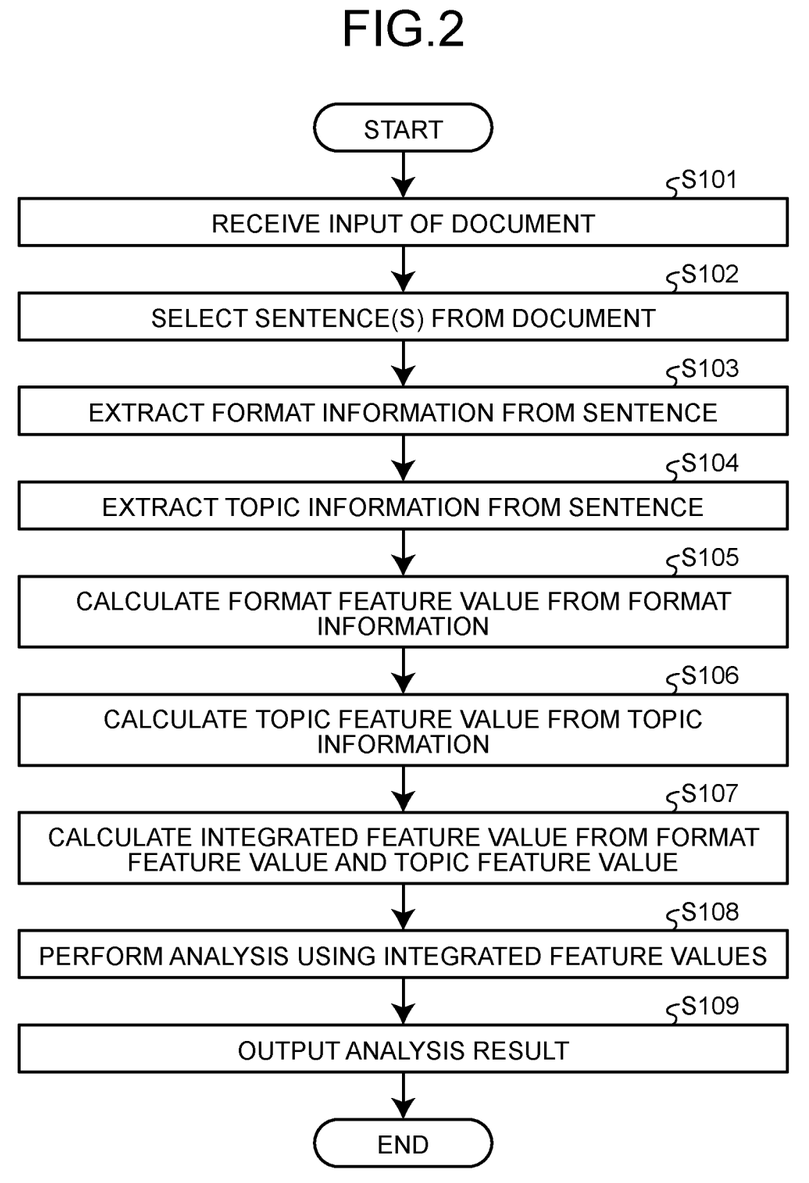
FIG. 2 is a flowchart of analysis processing according to the first embodiment.

Next, analysis processing of document data performed by the information processing device 100 according to the first embodiment will be described. FIG. 2 is a flowchart illustrating an example of the analysis processing according to the first embodiment.

The reception unit 101 receives input of document data (step S101). The selection unit 102 selects one or more sentences from the input document data (step S102).

Steps S103 to S107 below are executed for each of the selected sentences. First, the format extraction unit 104 extracts format information from each of the selected sentences (step S103). The topic extraction unit 103 extracts topic information from each of the selected sentences (step S104).

The format feature value calculation unit 106 calculates a format feature value from the format information (step S105). The topic feature value calculation unit 105 calculates a topic feature value from the topic information (step S106). The integrated feature value calculation unit 107 calculates an integrated feature value that is an integration of the format feature value and the topic feature value (step S107).

The analysis unit 108 executes analysis of the document data on the basis of the integrated feature values (step S108). The output control unit 109 outputs the analysis result acquired by the analysis unit 108 to the display 122 or the like (step S109), and ends the analysis processing.

Figure 3:
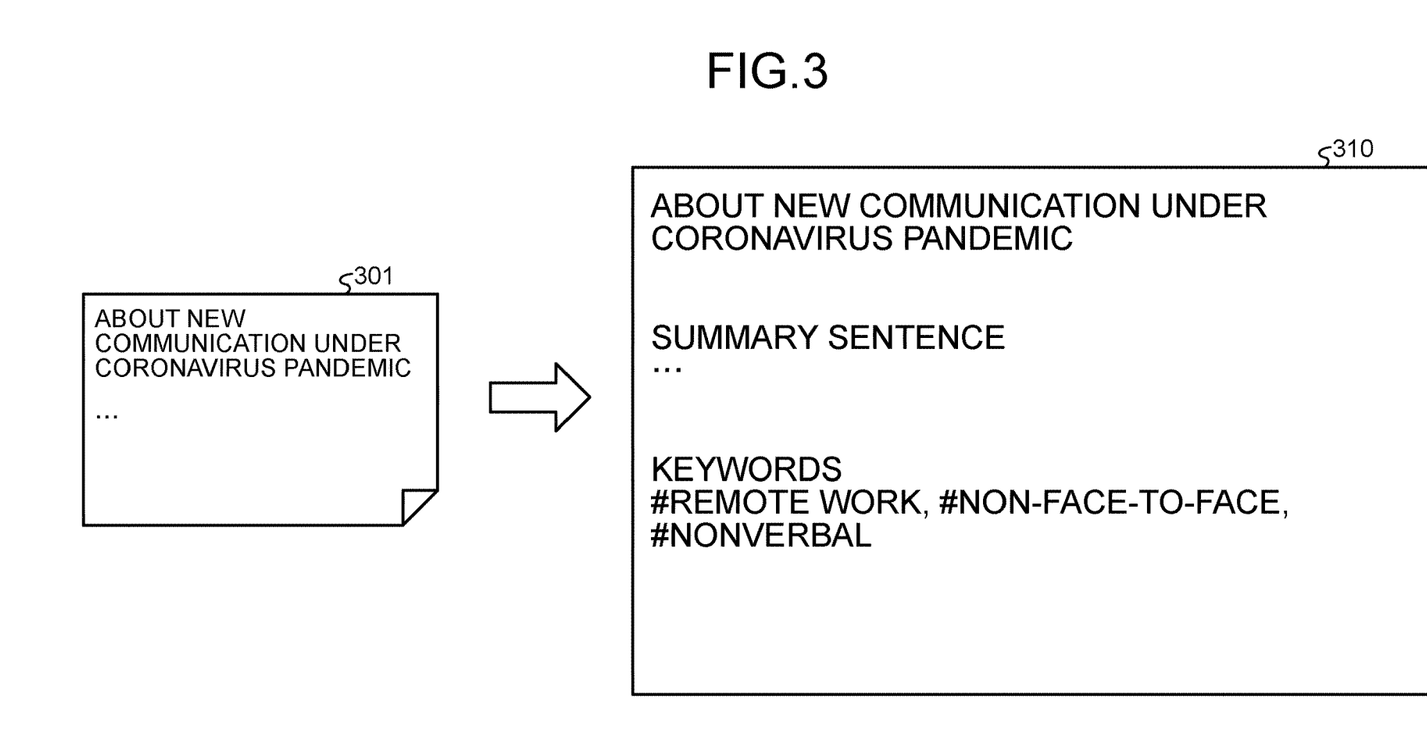
FIG. 3 is a diagram illustrating an example of a display screen.

FIG. 3 is a diagram illustrating an example of a display screen output by the output control unit 109. In FIG. 3, an example of a display screen 310 acquired by analyzing document data 301 with a title "About New Communication under the Coronavirus Pandemic" is illustrated.

In the display screen 310, a summary sentence and keywords extracted from the document data are displayed as the analysis result. By displaying the keywords, it is possible to grasp an overview of the document data without reading the summary.

As described, in the first embodiment, a plurality of pieces of information for specifying a plurality of attributes are extracted from the same document data, and the document data is analyzed by using a plurality of feature values that represent the features of the pieces of information. This makes it possible to analyze documents with higher accuracy. In addition, since a plurality of pieces of information are extracted from the same document data, there is no need to use a plurality of documents, as is the case, for example, with the above technology that generates a summary sentence by using background topic words.

Second Embodiment

An information processing device according to a second embodiment is different from the first embodiment in terms of the calculation method of topic feature values. Specifically, in the present embodiment, the similarity of the feature of the topic information of each sentence to the feature of the information representing the topic of the document data is calculated as a topic feature value.

Figure 4:
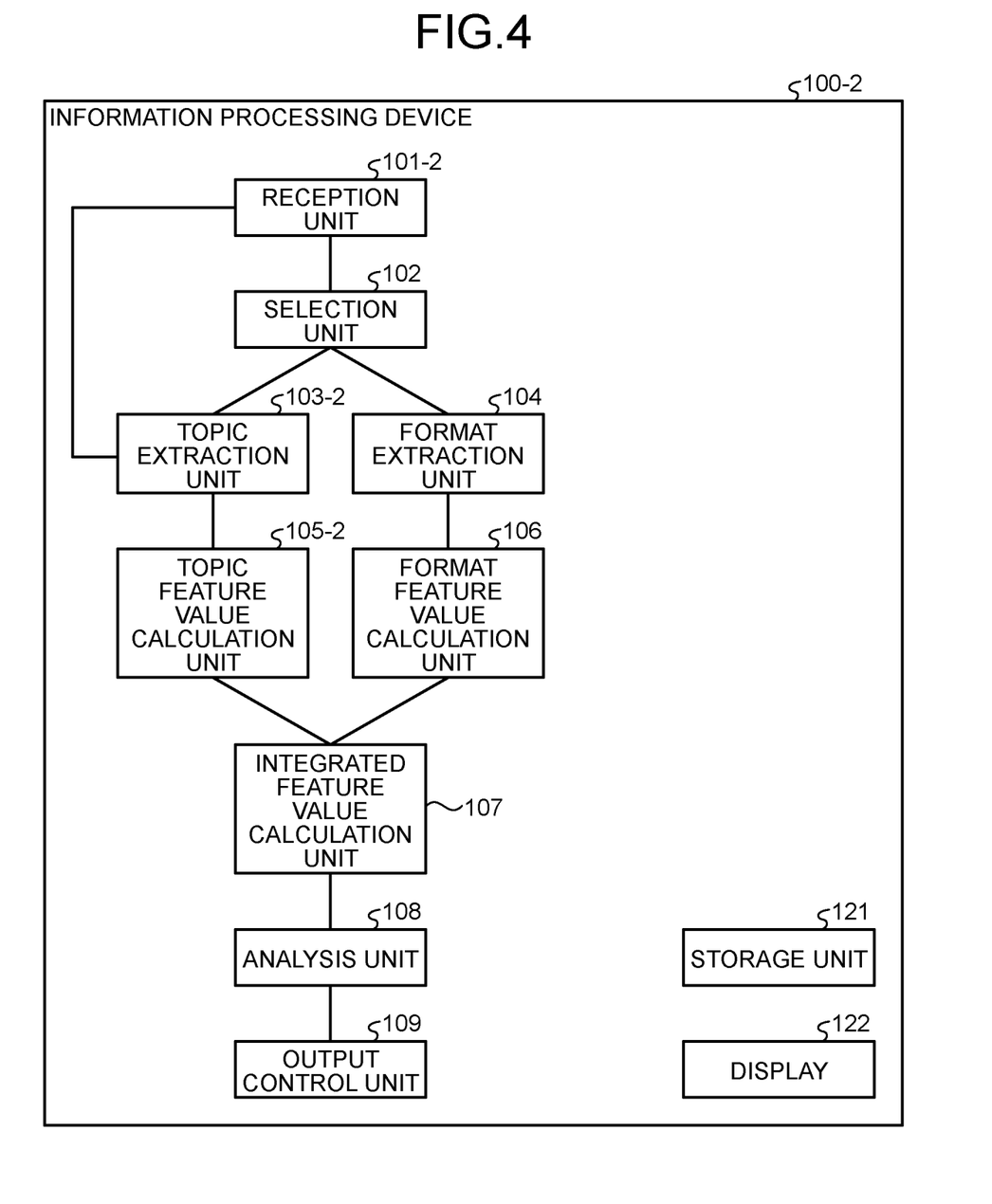
FIG. 4 is a block diagram of an information processing device according to a second embodiment.

FIG. 4 is a block diagram illustrating an example of a configuration of an information processing device 100-2 according to the second embodiment. As illustrated in FIG. 4, the information processing device 100-2 includes a reception unit 101-2, a selection unit 102, a topic extraction unit 103-2, a format extraction unit 104, a topic feature value calculation unit 105-2, a format feature value calculation unit 106, an integrated feature value calculation unit 107, an analysis unit 108, an output control unit 109, a storage unit 121, and a display 122.

In the second embodiment, functions of the reception unit 101-2, the topic extraction unit 103-2, and the topic feature value calculation unit 105-2 are different from those of the first embodiment. Other configurations and functions are similar to those in FIG. 1 that is a block diagram of the information processing device 100 according to the first embodiment. Therefore, the same reference signs are applied and the explanations thereof are omitted herein.

The reception unit 101-2 is different from the reception unit 101 of the first embodiment in respect that it outputs the received document data also to the topic extraction unit 103-2.

The topic extraction unit 103-2 further extracts, from the document data, document topic information (an example of document data information), which is a word or a phrase used for specifying an attribute describing a topic of the document data.

The topic feature value calculation unit 105-2 calculates the similarity of the feature of the topic information to the feature of the document topic information as a topic feature value.

While the similarity may be calculated in any manners, the topic feature value calculation unit 105-2 calculates the norm between vectors as the similarity, for example, since the two kinds of feature values are represented by vectors. For example, the topic feature value calculation unit 105-2 calculates L2 norm between a vector indicating the feature of the document topic information and a vector indicating the feature of the topic information. The larger the L2 norm, the lower the similarity. Therefore, the topic feature value calculation unit 105-2 determines, as the similarity, a value acquired by multiplying the L2 norm by −1 or a reciprocal of the L2 norm (1/L2 norm).

The topic feature value calculation unit 105-2 may calculate the cosine similarity between vectors as the similarity.

In the present embodiment, from the word sequences extracted as topic information, the analysis unit 108 may extract, as keywords, a predetermined number of words in descending order of the similarity to the document topic information. Moreover, the output control unit 109 may be configured to output a predetermined number of sentences in descending order of the similarity or sentences whose similarity is larger than a threshold.

Figure 5:
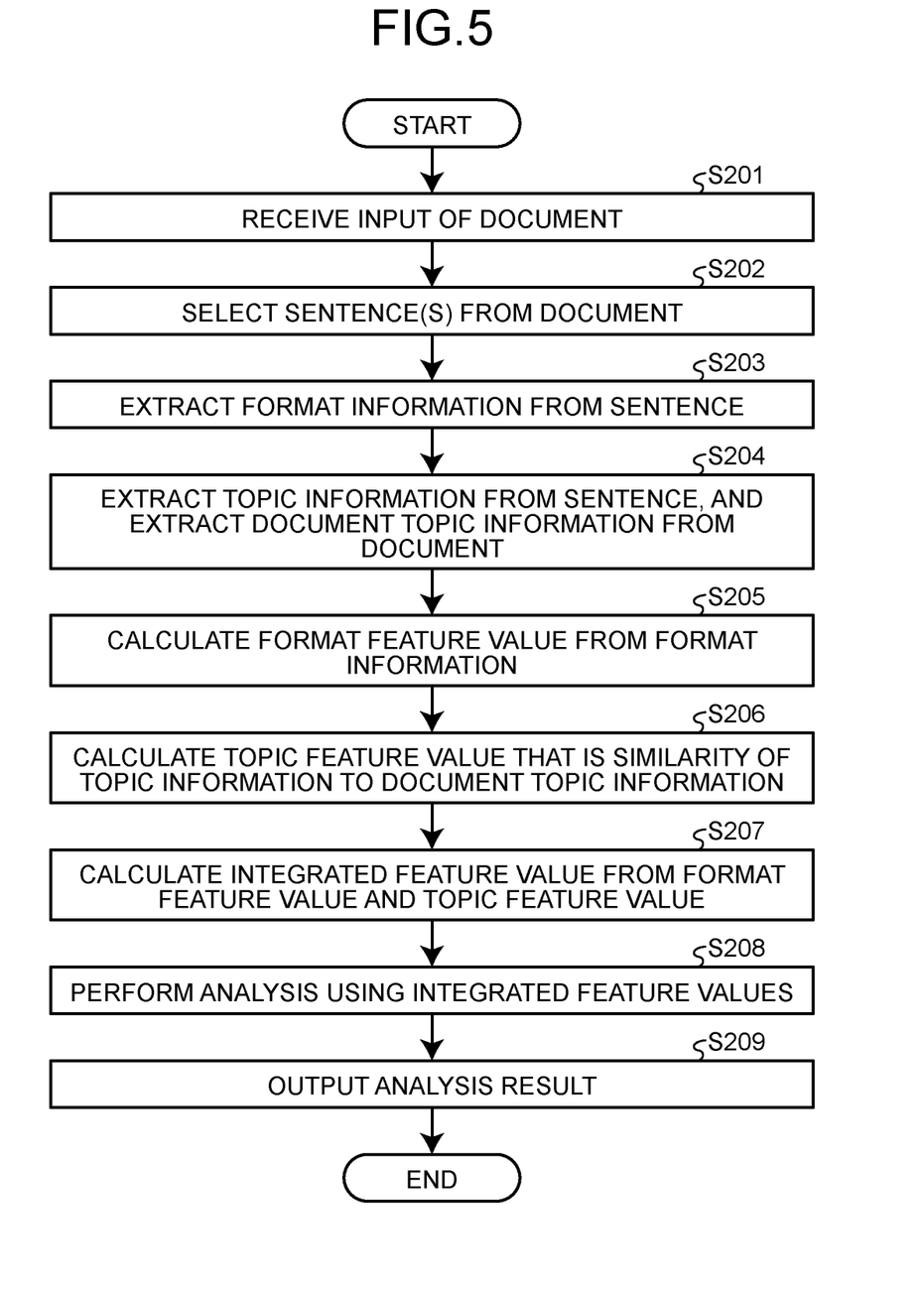
FIG. 5 is a flowchart of analysis processing according to the second embodiment.

Next, analysis processing performed by the information processing device 100-2 according to the second embodiment will be described by making reference to FIG. 5. FIG. 5 is a flowchart illustrating an example of the analysis processing according to the second embodiment.

In the second embodiment, steps S204 and S206 are different from steps S104 and S106 in the analysis processing of the first embodiment (FIG. 2). The other steps S201 to S203, S205, and S207 to S209 are processing similar to steps S101 to S103, S105, and S107 to S109. Therefore, the explanations thereof are omitted.

At step S204, the topic extraction unit 103-2 extracts topic information from each of the selected sentences and extracts document topic information from the entire document data (step S204).

At step S206, the topic feature value calculation unit 105-2 calculates a topic feature value that is the similarity of the topic information to the document topic information (step S206).

As described, in the present embodiment, the information indicating the feature of the topic information (the topic feature value in the first embodiment) is not used directly, but the similarity to the document topic information indicating the topic of the document data is used as the topic feature value of each sentence. This makes it possible to have such a configuration that the feature of the content itself of each sentence is not taken into account.

Whether a given sentence is an important sentence does not depend on the topic of that sentence. For example, when a sentence whose topic is sports and a sentence whose topic is movies are given, which sentence is more important is not determined by the kinds of topics. In a case where the topic of the entire document data is sports, if a sentence contains a sports topic, this sentence is considered as being important because it is likely to be highly relevant to the topic of the entire document data. On the other hand, if a sentence contains a movie topic, this topic is considered as being unimportant because this topic (movie) is different from the topic (sports) of the entire document data. Accordingly, not the topic itself but the high relevance (similarity) to the entire document data is important.

Therefore, in the present embodiment, the similarity of the topics between each sentence and the entire document data is used as the topic feature value. This makes it possible to perform analysis without depending on the topic of the document data, by excluding the feature of the topic itself and considering only the similarity to the entire document data.

Third Embodiment

As for an information processing device according to a third embodiment, an example further using an attribute different from the above embodiments will be described. Specifically, the present embodiment uses, as a plurality of attributes, an attribute (a third attribute) representing a style of partial document data, in addition to the attribute (the first attribute) describing a topic of the partial document data and the attribute (the second attribute) describing an expression used in common with other partial document data. Note that the attributes are not limited to these, but four or more attributes can be used as well.

Figure 6:
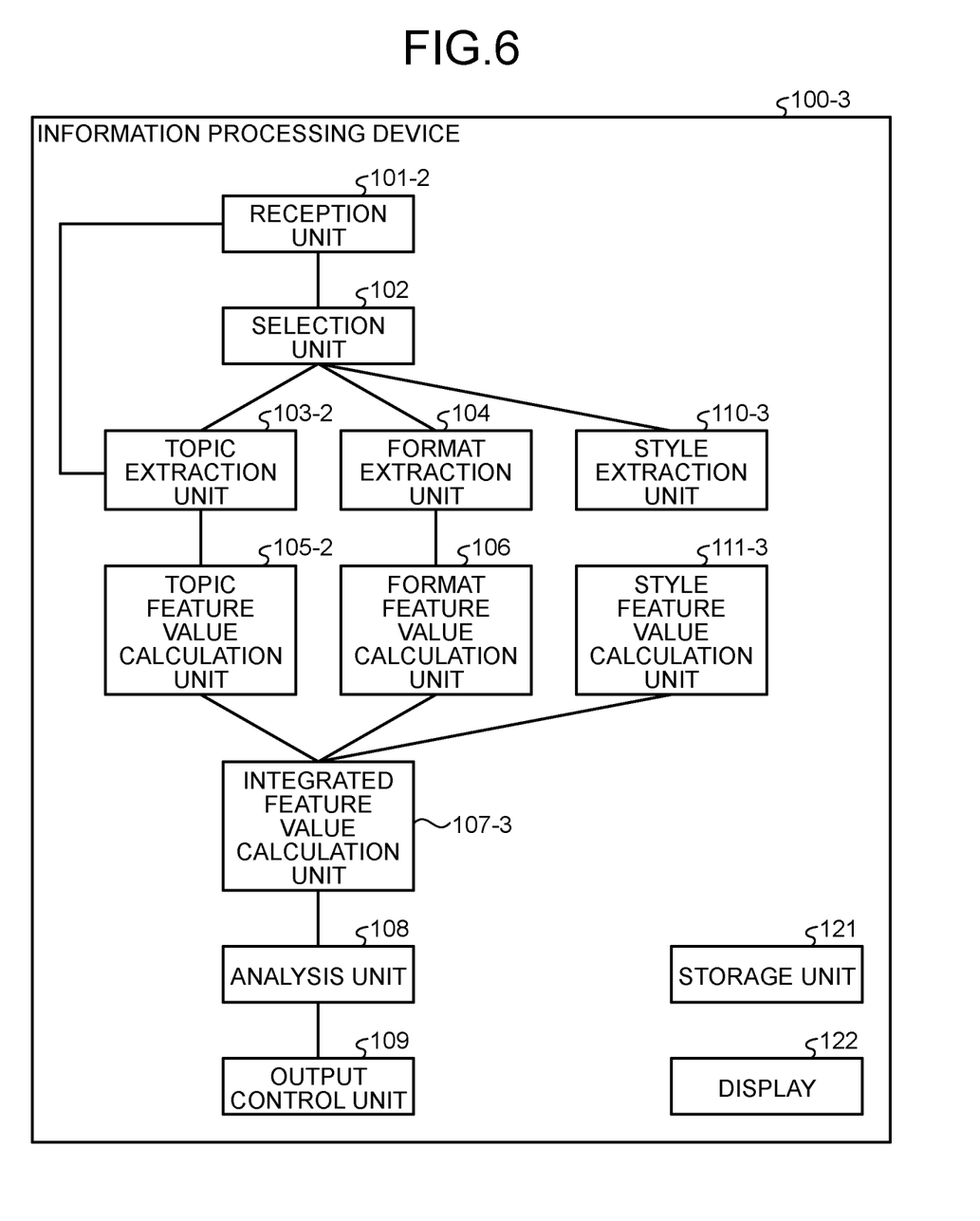
FIG. 6 is a block diagram of an information processing device according to a third embodiment.

FIG. 6 is a block diagram illustrating an example of a configuration of an information processing device 100-3 according to the third embodiment. As illustrated in FIG. 6, the information processing device 100-3 includes a reception unit 101-2, a selection unit 102, a topic extraction unit 103-2, a format extraction unit 104, a topic feature value calculation unit 105-2, a format feature value calculation unit 106, an integrated feature value calculation unit 107-3, an analysis unit 108, an output control unit 109, a style extraction unit 110-3, a style feature value calculation unit 111-3, a storage unit 121, and a display 122.

The third embodiment is different from the second embodiment in respect that it has the style extraction unit 110-3 and the style feature value calculation unit 111-3 added thereto, and in regard to the function of the integrated feature value calculation unit 107-3. Other configurations and functions are similar to those in FIG. 4 that is a block diagram of the information processing device 100-2 according to the second embodiment, and therefore, the same reference signs are applied and the explanations thereof are omitted herein.

While FIG. 6 illustrates an example of a configuration in which the style extraction unit 110-3 and the style feature value calculation unit 111-3 are added to the second embodiment (FIG. 4), it is also possible to add each of those units to the configuration of the first embodiment (FIG. 1).

The style extraction unit 110-3 extracts a sentence (partial document data) and style information (an example of third information) that is a word or a phrase for specifying an attribute (the third attribute) representing the style of the sentence.

Style information is, for example, information regarding the style of sentence description method. As described below, the features of the description methods vary depending on the kinds of document data.

Newspaper articles: Formal description method with "de-a-ru style" in Japanese

Sentences written by individuals on social media or the like: Frank description method Transcription of spoken words: Description method including fillers or hesitation such as "Um, . . . " and "Well, . . . "

Note that the format information, for example, is information indicating unique phrases (formulas), which is different from the style information. Therefore, style information related to the description method is extracted, and format information related neither to the description method nor to the topic is extracted.

Any method may be used for the extraction method of the style information and, for example, the following method may be applied.

First, document sets of various description methods are used for extracting style information. Examples thereof include document sets of newspaper articles, academic articles, social media, conference transcripts, transcripts of speeches, and the like.

First, a format information dictionary is generated by using each of the document sets by a method similar to the extraction method E1 described above, for example. Then, a plurality of format information dictionaries generated based on the document sets are compared with each other, and words not in common are stored in a style information dictionary and excluded from the format information dictionaries.

The style extraction unit 110-3 makes reference to the style information dictionary created in this manner, and extracts the words contained in the style information dictionary as style information from among the words contained in a selected sentence.

Extraction examples of the topic information, the format information, and the style information are presented below.
Example 3
Selected sentence: "So let's learn about communication under a remote work condition today."
Style information: "So let's ______."
Format information: "______ learn about ______ under ______ today."
Topic Information: "remote work, communication"
Example 4
Selected sentence: "I still think communication is important."
Style information: "I still ______ is ______."
Format information: "I ______ think ______ is important."
Topic Information: "communication"

By extracting the style information, it is possible to extract format information that is independent of the description method and contains more generic information.

The style feature value calculation unit 111-3 calculates the feature value (the third feature value) that represents the feature of the style information from the style information. Hereafter, the feature value calculated by the style feature value calculation unit 111-3 is referred to as a style feature value.

The style feature value calculation unit 111-3 may convert the style information into a vector by using a word2vec or BERT model and use the converted vector as the style feature value in a similar manner for the format information.

The style feature value calculation unit 111-3 may express the style information in a word sequence, convert each of the words contained in the word sequence into a vector by using word2vec or BERT and use the vector of the word sequence as the style feature value in a similar manner for the topic information.

The integrated feature value calculation unit 107-3 calculates an integrated feature value on the basis of the topic feature value, the format feature value, and the third feature value. For example, the integrated feature value calculation unit 107-3 calculates the integrated feature value by performing weighted addition of the three kinds of feature values or by performing multiplication of the three kinds of feature values. Since the style feature value is information indicating the description method, it may not be included in the integrated feature value. In other words, the integrated feature value calculation unit 107-3 may calculate an integrated feature value that is an integration of only the topic feature value and the format feature value.

Figure 7:
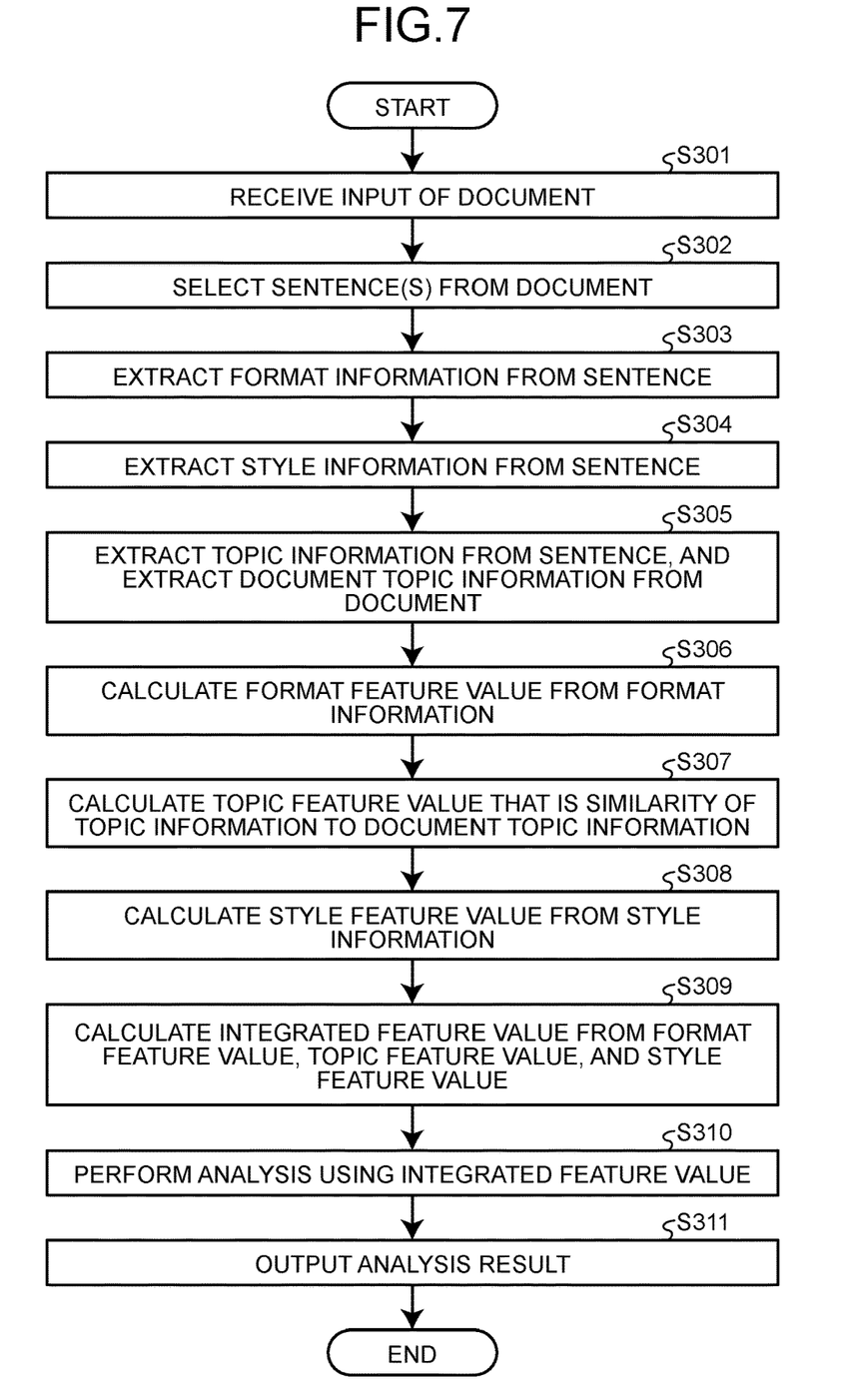
FIG. 7 is a flowchart of analysis processing according to the third embodiment.

Next, analysis processing performed by the information processing device 100-3 according to the third embodiment will be described by making reference to FIG. 7. FIG. 7 is a flowchart illustrating an example of the analysis processing according to the third embodiment.

The third embodiment is different from the analysis processing of the second embodiment (FIG. 5) in respect that steps S304 and S308 are added thereto, and in regard to step S309. Steps S301 to S303, S305 to S307, and S310 to 5311 are processing similar to steps S201 to S203, S204 to S206, and S208 to S209 in FIG. 5. Therefore, the explanations thereof are omitted.

At step S304, the style extraction unit 110-3 extracts style information from a selected sentence (step S304).

At step S308, the style feature value calculation unit 111-3 calculates a style feature value from the style information (step S308).

At step S309, the integrated feature value calculation unit 107-3 calculates an integrated feature value that is an integration of the format feature value, the topic feature value, and the style feature value (step S309).

In this manner, the third embodiment can execute analysis of document data using the feature values related to the three kinds of attributes. This makes it possible to analyze document data with higher accuracy.

As described above, according to the first to third embodiments, it is possible to analyze documents with higher accuracy.

Figure 8:
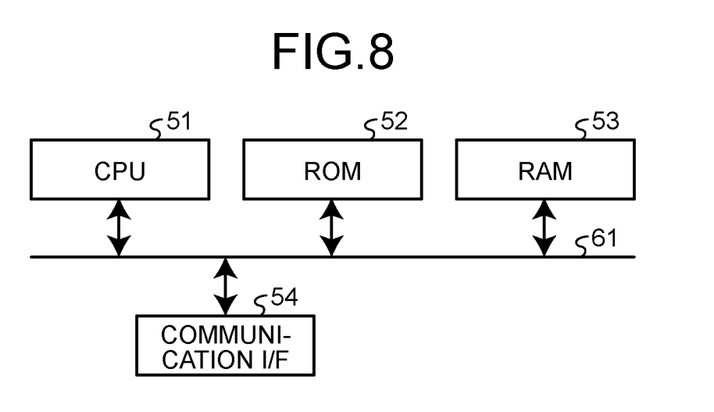
FIG. 8 is a hardware configuration diagram of the information processing devices according to the embodiments.

Next, the hardware configuration of the information processing devices according to the first to third embodiments will be described by making reference to FIG. 8. FIG. 8 is a diagram illustrating an example of the hardware configuration of the information processing devices according to the first to third embodiments.

The information processing devices according to the first to third embodiments include a control device such as a CPU 51, memory devices such as a read-only memory (ROM) 52 and a random-access memory (RAM) 53, a communication I/F 54 that is connected to a network for performing communication, and a bus 61 that connects the units.

A computer program to be executed by the information processing devices according to the first to third embodiments is provided by being integrated in advance in the ROM 52 or the like.

The computer program to be executed by the information processing devices according to the first to third embodiments may be recorded in an installable or executable format file on a computer readable recording medium such as a compact disc read-only memory (CD-ROM), a flexible disk (FD), a compact disc recordable (CD-R), a digital versatile disc (DVD), or the like, and may be provided as a computer program product.

Moreover, the computer program to be executed by the information processing devices according to the first to third embodiments may be stored on a computer connected to a network such as the Internet and may be provided by being downloaded via the network. The computer program executed by the information processing devices according to the first to third embodiments may be provided or distributed via a network such as the Internet.

The computer program executed by the information processing devices according to the first to third embodiments may cause the computer to function as each of the units of the information processing devices described above. As for the computer, the CPU 51 can read the computer program from a computer-readable storage medium and execute it on the main memory.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising
one or more hardware processors configured to:
    select one or more pieces of partial document data from document data;
    extract, from the partial document data, first information being one or more words or phrases for specifying a first attribute describing a topic of the partial document data;
    extract, from the partial document data, as second information, one or more words or phrases that remain in the partial document data after extracting the first information, the second information being one or more words or phrases for specifying a second attribute of the partial document data, the second attribute describing an expression used in common with other partial document data;
    calculate a first feature value representing a feature of the first information;
    calculate a second feature value representing a feature of the second information;
    analyze the document data on the basis of the first feature value and the second feature value, and
    output an analysis result to at least one of a display and another device connected via a network.

2. The information processing device according to claim 1, wherein the one or more hardware processors are configured to:
    calculate an integrated feature value on the basis of the first feature value and the second feature value, the integrated feature value representing a feature of the partial document data; and
    perform the analysis of the document data by using one or more of the integrated feature values calculated for each of one or more pieces of the partial document data.

3. The information processing device according to claim 2, wherein the one or more hardware processors are configured to perform the calculation of the integrated feature value by performing weighted addition of the first feature value and the second feature value or by performing multiplication of the first feature value and the second feature value.

4. The information processing device according to claim 2, wherein
    the one or more hardware processors are configured to:
        extract, from the partial document data, third information other than the first information and the second information, the third information being one or more words or phrases for specifying a third attribute representing a style of the partial document data, the style indicating one of styles of sentence description methods that include a formal description method, a frank description method, and a description method including a filler or a hesitation;
        calculate a third feature value representing a feature of the third information; and
        perform the calculation of the integrated feature value on the basis of the first feature value, the second feature value, and the third feature value.

5. The information processing device according to claim 1, wherein the one or more hardware processors are configured to:
    compare a first analysis result and a second analysis result, the first analysis result being acquired by analyzing the document data by using the first feature value, the second analysis result being acquired by analyzing the document data by using the second feature value; and
    output either one of the first analysis result and the second analysis result in accordance with a prescribed rule in a case where the first analysis result and the second analysis result do not correspond to one another.

6. The information processing device according to claim 1, wherein the one or more hardware processors are configured to:
    extract, from the document data, document data information being one or more words or phrases for specifying the first attribute of the document data; and
    calculate, as the first feature value, a similarity of the feature of the first information to a feature of the document data information.

7. The information processing device according to claim 6, wherein the one or more hardware processors are configured to output a predetermined number of pieces of the partial document data in descending order of the similarity, or output the partial document data with the similarity being equal to or larger than a threshold.

8. The information processing device according to claim 1, wherein the one or more hardware processors are configured to assign a label to each of one or more pieces of the partial document data contained in the document data on the basis of the first feature value and the second feature value.

9. The information processing device according to claim 1, wherein the one or more hardware processors are configured to generate a summary sentence of the document data on the basis of the first feature value and the second feature value.

10. The information processing device according to claim 1, wherein the one or more hardware processors are configured to:
   extract, as the first information, one or more words or phrases contained in dictionary information containing one or more words or phrases representing an attribute defined in advance; and
   extract, as the second information, one or more words or phrases that remain in the partial document data after extracting the first information.

11. The information processing device according to claim 1, wherein the one or more hardware processors are configured to:
   extract, as the first information, one or more words or phrases not contained in dictionary information containing one or more words or phrases representing an attribute defined in advance; and
   extract, as the first second information, one or more words or phrases that remain in the partial document data after extracting the first information.

12. The information processing device according to claim 1, wherein the one or more hardware processors are configured to:
   extract, as the first information, one or more words or phrases whose score representing a frequency in the document data is smaller than a threshold; and
   extract, as the second information, one or more words or phrases that remain in the partial document data after extracting the first information.

13. The information processing device according to claim 1, wherein the one or more hardware processors are configured to:
   extract the first information that is associated with a first confidence level indicating certainty of the first information representing the first attribute;
   extract the second information that is associated with a second confidence level indicating certainty of the second information representing the second attribute;
   perform the calculation of the first feature value by multiplying a value representing the feature of the first information by the first confidence level; and
   perform the calculation of the second feature value by multiplying a value representing the feature of the second information by the second confidence level.

14. An information processing method implemented by a computer, the method comprising:
   selecting one or more pieces of partial document data from document data;
   extracting, from the partial document data, first information being one or more words or phrases for specifying a first attribute describing a topic of the partial document data;
   extracting, from the partial document data, as second information, one or more words or phrases that remain in the partial document data after extracting the first information, the second information being one or more words or phrases for specifying a second attribute of the partial document data, the second attribute describing an expression used in common with other partial document data;
   calculating a first feature value representing a feature of the first information;
   calculating a second feature value representing a feature of the second information;
   analyzing the document data on the basis of the first feature value and the second feature value; and
   outputting an analysis result to at least one of a display and another device connected via a network.

15. A computer program product comprising a non-transitory computer-readable recording medium on which a computer program executable by a computer is recorded, the computer program instructing the computer to:
   select one or more pieces of partial document data from document data;
   extract, from the partial document data, first information being one or more words or phrases for specifying a first attribute describing a topic of the partial document data;
   extract, from the partial document data, as second information, one or more words or phrases that remain in the partial document data after extracting the first information, the second information being one or more words or phrases for specifying a second attribute of the partial document data, the second attribute describing an expression used in common with other partial document data;
   calculate a first feature value representing a feature of the first information;
   calculate a second feature value representing a feature of the second information;
   analyze the document data on the basis of the first feature value and the second feature value; and
   output an analysis result to at least one of a display and another device connected via a network.

16. The information processing device according to claim 1, wherein the one or more hardware processors are configured to:
   extract, as the second information, all of the one or more words or phrases that remain in the partial document data after extracting the first information.

* * * * *